United States Patent [19]

Sugita

[11] 4,325,585
[45] Apr. 20, 1982

[54] FLUID BEARING

[75] Inventor: Kazuhiko Sugita, Anjo, Japan

[73] Assignee: Toyoda Koki Kabushiki Kaisha, Kariya, Japan

[21] Appl. No.: 195,179

[22] Filed: Oct. 8, 1980

[51] Int. Cl.³ .............................................. F16C 32/06
[52] U.S. Cl. ..................................... 308/9; 308/122; 308/240
[58] Field of Search ........................... 308/9, 122, 240

[56] References Cited

U.S. PATENT DOCUMENTS

| 3,454,311 | 7/1969 | Tomita et al. | 308/122 |
| 3,726,573 | 4/1973 | Unno | 308/9 |
| 3,785,708 | 1/1974 | Miyasaki | 308/9 |
| 3,945,692 | 3/1976 | Tsujiuchi | 308/9 |
| 4,090,743 | 5/1978 | Suzuki et al. | 308/240 |

FOREIGN PATENT DOCUMENTS

| 1802027 | 4/1970 | Fed. Rep. of Germany | 308/122 |
| 41-11842 | 2/1966 | Japan | 308/9 |
| 90293 | 2/1959 | Netherlands | 308/122 |

Primary Examiner—Richard R. Stearns
Attorney, Agent, or Firm—Oblon, Fisher, Spivak, McClelland & Maier

[57] ABSTRACT

A fluid bearing for rotatably supporting a rotary shaft. A bearing member comprises a plurality of U-shaped fluid pockets and a plurality of first land portions formed on the bearing surface of the bearing member. Each of the U-shaped fluid pockets is defined by a pair of axially spaced fluid pockets and a supply groove. Each supply groove is formed in parallel relationship with the axis of the bearing member for fluidically communicating the pair of fluid pockets. Each of the first land portions is formed between the pair of fluid pockets for generating hydrodynamic pressure. Each fluid pocket is provided with two second land portions. Each of the supply grooves is located at a lower position in a gravitational direction in its associated U-shaped fluid pocket. The plurality of U-shaped fluid pockets are arranged symmetrically with respect to a vertical plane which includes the center of the bearing member.

3 Claims, 5 Drawing Figures

FLUID BEARING

BACKGROUND OF THE INVENTION

1. Field of the Invention

The present invention relates to a fluid bearing for supporting a rotary shaft by means of a pressurized fluid, and more particularly to a fluid bearing which is capable of preventing bearing seizure even if the rotary shaft continues to rotate due to its inertia after the electric supply is interrupted and, thus, supply of pressurized fluid is stopped.

2. Description of the Prior Art

In general, a bearing device for a spindle of a machine tool is subjected to an excessive load, such as a vibration load, during machining operation. A bearing device depending on only a static bearing support may not be able to bear such an excessive load. For this reason, there is provided in a hydrostatic pressure generating zone a land portion which is capable of heightening bearing rigidity for such a vibration load. In a normal condition, fluid is supplied to the land portion from a pressure fluid supply pump, however, if the pressure fluid supply pump is stopped due to interruption of electric supply and thus generation of hydrostatic pressure disappears, bearing seizure may be caused at the land portion where a radial load is applied due to a lack of lubricating fluid. In order to overcome this disadvantage, it has been considered to provide a fluid bearing which is capable of introducing fluid which is remaining on a bearing surface into a land portion. Such a fluid bearing is shown in FIGS. 1 and 2, wherein four pressure generating zone PZ as indicated in dotted lines are circumferentially arranged on the bearing surface of a bearing member 11. Each pressure generating zone PZ is provided with a pair of axially spaced fluid pockets 13a and 13b, a land portion 14 and a supply groove 13c. Each supply groove 13c is formed so as to connect the edge portions of the pair of fluid pockets 13a and 13b. The bearing member 11 is mounted on a grinding wheel support (not shown) in such a way that the supply groove 13c at a land portion 14 where a radial load F1 is applied is located in a lower position in a gravitational direction, so that fluid remaining on the bearing surface is collected in the supply groove 13c due to its gravity when the pressure fluid supply pump is stopped. Accordingly, even if a rotary shaft 12 continues to rotate due to its inertia immediately after the stoppage of the supply pump, the remaining fluid in the supply groove 13c is introduced into the land portion 14 together with the rotation of the rotary shaft 12, so that bearing seizure due to a lack of lubricating fluid may be prevented.

However, if a radial load F2 is applied to a land portion 14 opposite to the land portion 14 where the radial load F1 is applied, it may suffer from bearing seizure due to a lack of lubricating fluid, because a supply groove 13c at the land portion 14 where the radial load F2 is applied is located in a higher position in a gravitational direction and thus fluid is collected in the fluid pockets 13a and 13b instead of the supply groove 13c. Therefore, fluid is hardly introduced to the land portion 14.

Such a disadvantage occurs in the following occasions. Generally, the disposition of a grinding wheel relative to a pulley for driving the same in a straight type grinding machine is different from that of an angular type grinding machine. Thus, as viewed from a work table (not shown) on which a workpiece is mounted, bearing members used for a pulley side and for a grinding wheel side are disposed respectively on the right and left side in the straight type grinding machine and are conversely disposed respectively on the left and right side in the angular type grinding machine. It is impossible to adapt the bearing members used for the pulley side to that used for the grinding wheel side or vice versa, because there are many different parts. However, it is desirable to provide a bearing member used for the pulley side or the grinding wheel side which can be used in common for both straight type and angular type grinding machines.

When the bearing member used for the pulley side in the angular type grinding machine is used for the pulley side in the straight type grinding machine, it is disposed on the right side, as viewed from the work table, and a radial load which is caused by the weight of the rotary shaft 12 and the belt tention of the pulley is changed, for example, from F1 to F2 as shown in FIG. 2.

Accordingly, bearing seizure may be caused at the land portion 14 where the radial load F2 is applied, if a conventional bearing member such as shown in FIGS. 1 and 2 is used in common, because the supply groove 13c is located in a higher position.

SUMMARY OF THE INVENTION

It is therefore an object of the present invention to provide a new and improved fluid bearing capable of preventing bearing seizure even if the rotary shaft continues to rotate due to its inertia immediately after the electric supply is interrupted and thus, supply of pressurized fluid is stopped.

Another object of the present invention is to provide a new and improved fluid bearing capable of preventing bearing seizure at any land portion where a radial load is applied.

A further object of the present invention is to provide a new and improved fluid bearing capable of being used in common for both straight type and angular type grinding machines.

Briefly according to the present invention, these and other objects are achieved by providing a fluid bearing for rotatably supporting a rotary shaft, as mentioned below. A bearing member has a internal bore which forms a bearing surface. A plurality of U-shaped fluid pockets are formed in a circumferential direction on the bearing surface. Each of the U-shaped fluid pockets is defined by a pair of axially spaced rectangular fluid pockets and a supply groove formed in parallel relationship with the axis of the bearing member for fluidically communicating the pair of fluid pockets. A plurality of first land portions are formed between the pair of fluid pockets. A supply port is formed in each of the supply grooves for admitting pressurized fluid. At least one second land portion is formed in each of the fluid pockets and an exhaust port is formed in each of the second land portions for discharging pressurized fluid. Each of the supply grooves is located at a lower position in a gravitational direction in its associated U-shaped fluid pocket. The plurality of U-shaped fluid pockets are arranged symmetrically with respect to a vertical plane which includes the axis of the bearing member.

BRIEF DESCRIPTION OF THE DRAWINGS

The foregoing and other objects and many of the attendant advantages of the present invention will be readily appreciated as the same becomes better understood by reference to the following detailed description when considered in connection with the accompanying drawings, in which.

DETAILED DESCRIPTION OF THE PREFERRED EMBODIMENT

Figure 1:
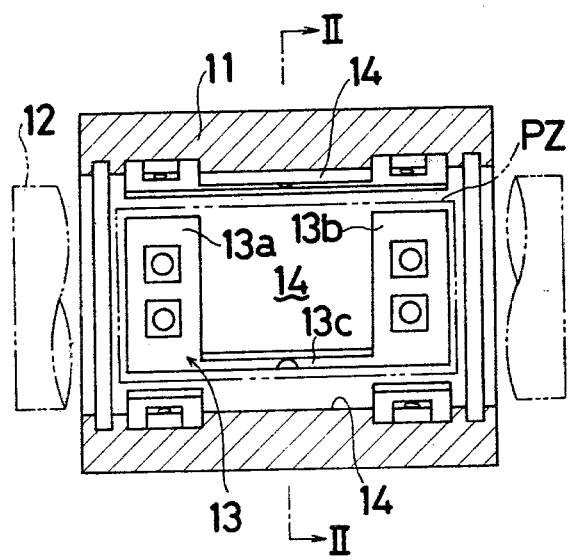
FIG. 1 is a longitudinal sectional view of a conventional fluid bearing, taken along a line I—I in FIG. 2.
Figure 2:
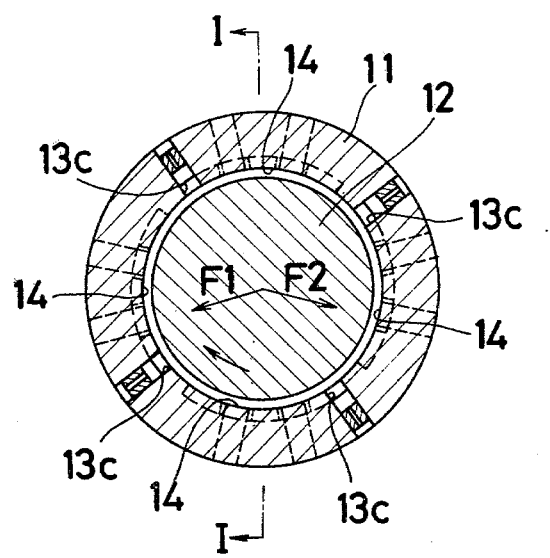
FIG. 2 is a sectional view taken along a line II—II in FIG. 1.
Figure 3:
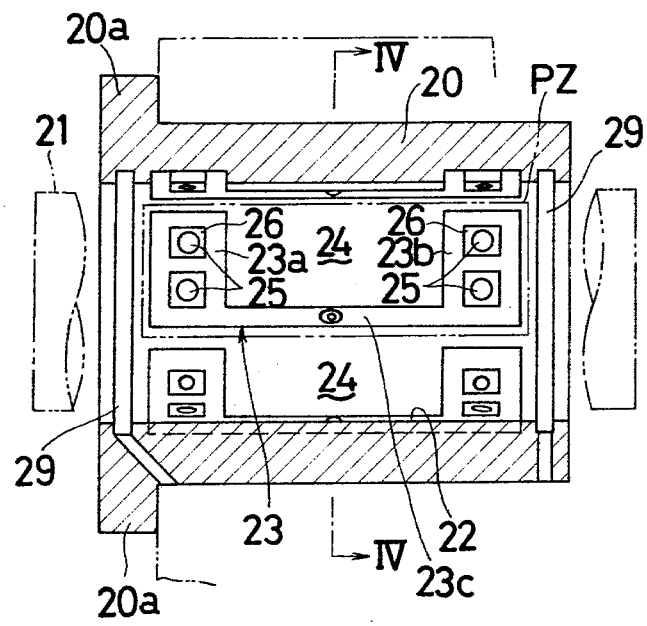
FIG. 3 is a longitudinal sectional view of a fluid bearing according to the present invention, taken along a line III—III in FIG. 4.
Figure 4:
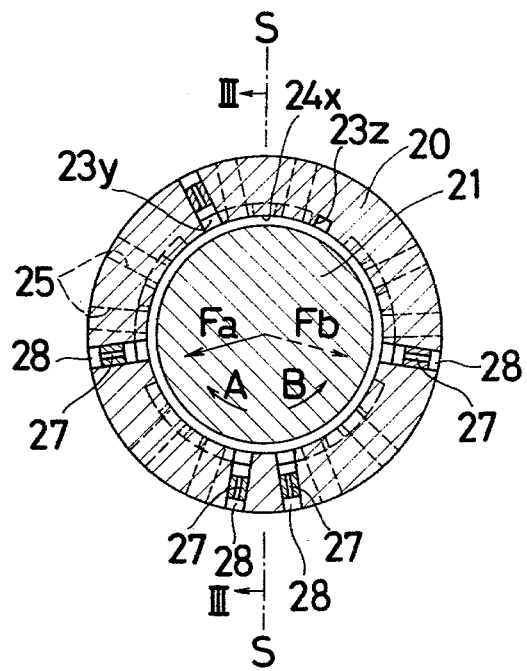
FIG. 4 is a sectional view taken along a line IV—IV in FIG. 3.
Figure 5:
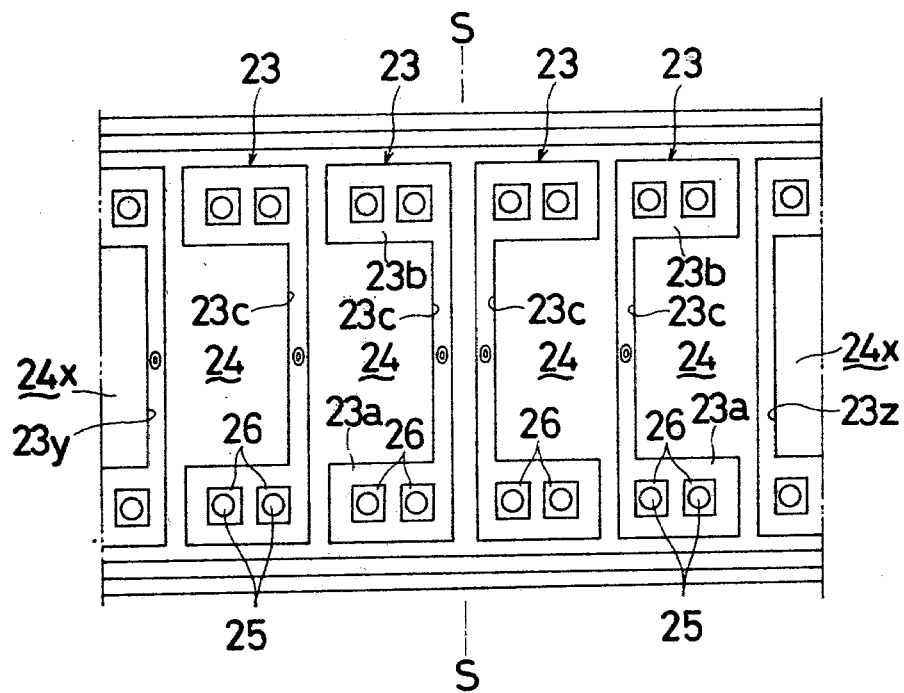
FIG. 5 is an expansion plan unfolded from the top of the bearing surface in FIG. 4, showing an arrangement of U-shaped fluid pockets.

Referring now to the drawings, wherein like reference numerals or characters refer to identical or corresponding parts throughout the several views, and more particularly to FIGS. 3 and 4, a bearing member 20 has an inner bore or a bearing surface 22 which provides rotatable support for a rotary shaft 21, subjected to a radial load, by means of pressurized fluid supplied into a small clearance formed between the bearing surface 22 and the outer surface of the rotary shaft 21. A flange 20a is provided for mounting the bearing member 20 on a grinding wheel support (not shown). Five pressure generating zones PZ as indicated in dotted lines in FIG. 3 are circumferentially arranged on the bearing surface 22. Four of the pressure generating zones PZ have U-shaped fluid pockets 23 and land portions 24, and the rest of the pressure generating zones has a rectangular fluid pocket 23d and a land portion 24x. Each of the U-shaped fluid pockets 23 is defined by a pair of axially spaced fluid pockets 23a and 23b, which are rectangular in shape and have the same axial width, and a supply groove 23c formed on the bearing surface 22 in parallel relationship with the axis of the bearing member 20 so as to communicate the pair of fluid pockets 23a and 23b. Each land portion 24 is formed on the bearing surface 22 and located between the pair of fluid pockets 23a and 23b. On the middle of each supply groove 23c, a supply port 28 is formed and extends to the outer periphery of the bearing member 20. A throttle member 27 having a small throttle bore is interposed in the supply port 28 which receives pressurized fluid from a pressure fluid supply pump (not shown). A pair of annular exhaust grooves 29 are formed on the bearing surface 22 outside the pressure generating zones PZ. Two small land portions 26 are circumferentially arranged in each of the fluid pockets 23a and 23b and an exhaust port 25 is formed on each of the small land portions 26 so as to discharge fluid to a reservoir (not shown).

The rectangular fluid pocket 23d is formed similarly to the U-shaped fluid pocket 23, but it has two grooves 23y and 23z formed on the bearing surface 22 to enclose the land portion 24x together with the pair of fluid pockets 23a and 23b. The groove 23y is similar to the supply groove 23c and is provided with a supply port 28. The rectangular fluid pocket 23d is located at an uppermost position and is divided into two symmetrical parts except the supply port 28 by a vertical plane S—S which includes the center axis of the bearing member 20.

In each of the U-shaped fluid pockets 23, the supply groove 23c is formed at a lower position in a gravitational direction. Further, all of the U-shaped fluid pockets 23 are arranged symmetrically with respect to the vertical plane S—S.

In this embodiment, all of the pressure generating zones PZ including the U-shaped fluid pockets 23 and the rectangular fluid pocket 23d except the supply port 28 of the groove 23y are arranged symmetrically with respect to the vertical plane S—S. However, it is merely necessary to symmetrically arrange the U-shaped fluid pockets except the rectangular fluid pocket 23d in order to carry out the objects of the present invention.

In operation, when pressurized fluid is supplied into the supply ports 28 from the supply pump, this pressurized fluid is admitted through the throttles 27 into the supply grooves 23c and 23y and the fluid pockets 23a and 23b to form a fluid film between the rotary shaft 21 and the bearing surface 22. Pressurized fluid is exhausted from the exhaust grooves 29 and the exhaust ports 25 through the clearance formed between the rotary shaft 21 and the bearing surface 22. As a result, hydrostatic pressure depending upon the flow resistance or the clearance between the rotary shaft 21 and the bearing surface 22 is generated at the pressure generating zones PZ so that the positional fluctuation of the rotary shaft 21 relative to the bearing member 20 is minimized. Furthermore, when the rotary shaft 21 is rotated, pressurized fluid supplied into the supply grooves 23c and the groove 23y is introduced into the clearance between the land portions 24 and 24x and the rotary shaft 21 to thereby generate hydrodynamic pressure which serves to heighten bearing rigidity and resistance against a vibration load.

It is assumed that the bearing member 20 is used for the pulley side in an angular type grinding machine and thus a radial load Fa is applied to a land portion 24 as a result of the weight of the rotary shaft 21 and the belt tention of the pulley. When the pressure fluid supply pump is stopped due to interruption of electric supply, fluid remaining on the bearing surface 22 is gravitationally collected in the supply grooves 23c. Therefore, even if the rotary shaft 21 continues to rotate due to its inertia immediately after stoppage of the supply pump, the remaining fluid in the supply groove 23c is smoothly introduced into the land portion 24 where the radial load Fa is applied together with the rotation of the rotary shaft 21, so that bearing seizure at the land portion 24 may be prevented. In the case that the bearing member 20 used for the pulley side in the angular type grinding machine is used for the pulley side in the straight type grinding machine, the disposition of the bearing member 20 is changed from the left side to the right side, as viewed from a work table and the radial load is changed from Fa to Fb as a result of the weight of the rotary shaft 21 and the belt tention of the pulley, while a rotational direction A of the rotary shaft 21 is changed to a rotational direction B. It will be understood that bearing seizure at the land portion 24 where the radial load Fb is applied can be also prevented, because all of the U-shaped fluid pockets are arranged symmetrically with respect to the vertical plane S—S. Therefore, it will be understood that the bearing member 20 can be used in common for both straight type and angular type grinding machines.

In this embodiment, a pressure generating zone PZ which is provided with a rectangular fluid pocket 23d is located at the uppermost position, however, such a pressure generating zone PZ may be located at the bottom of the bearing member 20. Further, the number of pressure generating zones PZ is not limited to five and, if the number is even, it will be understood that pressure generating zones PZ can be arranged perfectly symmetrically with respect to the vertical plane S—S, since there is no rectangular fluid pocket 23d.

Obviously, numerous modifications and variations of the present invention are possible in light of the above teachings. It is therefore to be understood that within the scope of the appended claims, the invention may be practiced otherwise than as specifically described herein.

What I claim is:

1. A fluid bearing for rotatably supporting a rotary shaft comprising:
   a bearing member having an internal bore which forms a bearing surface;
   a plurality of U-shaped fluid pockets formed in a circumferential direction on said bearing surface;
   each of said U-shaped fluid pockets being defined by a pair of axially spaced rectangular fluid pockets and a supply groove formed in parallel relationship with the axis of said bearing member for fluidically communicating said pair of fluid pockets;
   a plurality of first land portions formed between said pair of fluid pockets;
   a supply port formed in each of said supply grooves for admitting pressurized fluid;
   at least one second land portion formed in each of said fluid pockets;
   an exhaust port formed in each of said second land portions for discharging pressurized fluid;
   each of said supply grooves being located at a lower position in a gravitational direction in its associated U-shaped fluid pocket;
   said plurality of U-shaped fluid pockets being arranged symmetrically with respect to a vertical plane which includes the axis of said bearing member.

2. A fluid bearing as claimed in claim 1, further comprising a rectangular fluid pocket which is defined by a pair of axially spaced fluid pockets and two grooves formed at the opposite sides of said pair of fluid pockets, and is arranged in a circumferential direction together with said U-shaped fluid pockets.

3. A fluid bearing as claimed in claim 2, wherein said rectangular fluid pocket is located at the uppermost position.

* * * * *

UNITED STATES PATENT AND TRADEMARK OFFICE
CERTIFICATE OF CORRECTION

PATENT NO. : 4,325,585
DATED : Apr. 20, 1982
INVENTOR(S) : Sugita, Kazuhiko

It is certified that error appears in the above—identified patent and that said Letters Patent is hereby corrected as shown below:

On the title page the priority data should read as follows:

[30] -- Foreign Application Priority Data
Oct. 19, 1979 [JP] Japan ........ 134818/1979 --

Signed and Sealed this

Thirteenth Day of July 1982

[SEAL]

Attest:

*Attesting Officer*

GERALD J. MOSSINGHOFF

*Commissioner of Patents and Trademarks*